Feb. 13, 1923.
Re. 15,541
P. J. SIMMEN
AUTOMATIC TRAIN CONTROL
Original Filed Dec. 6, 1921
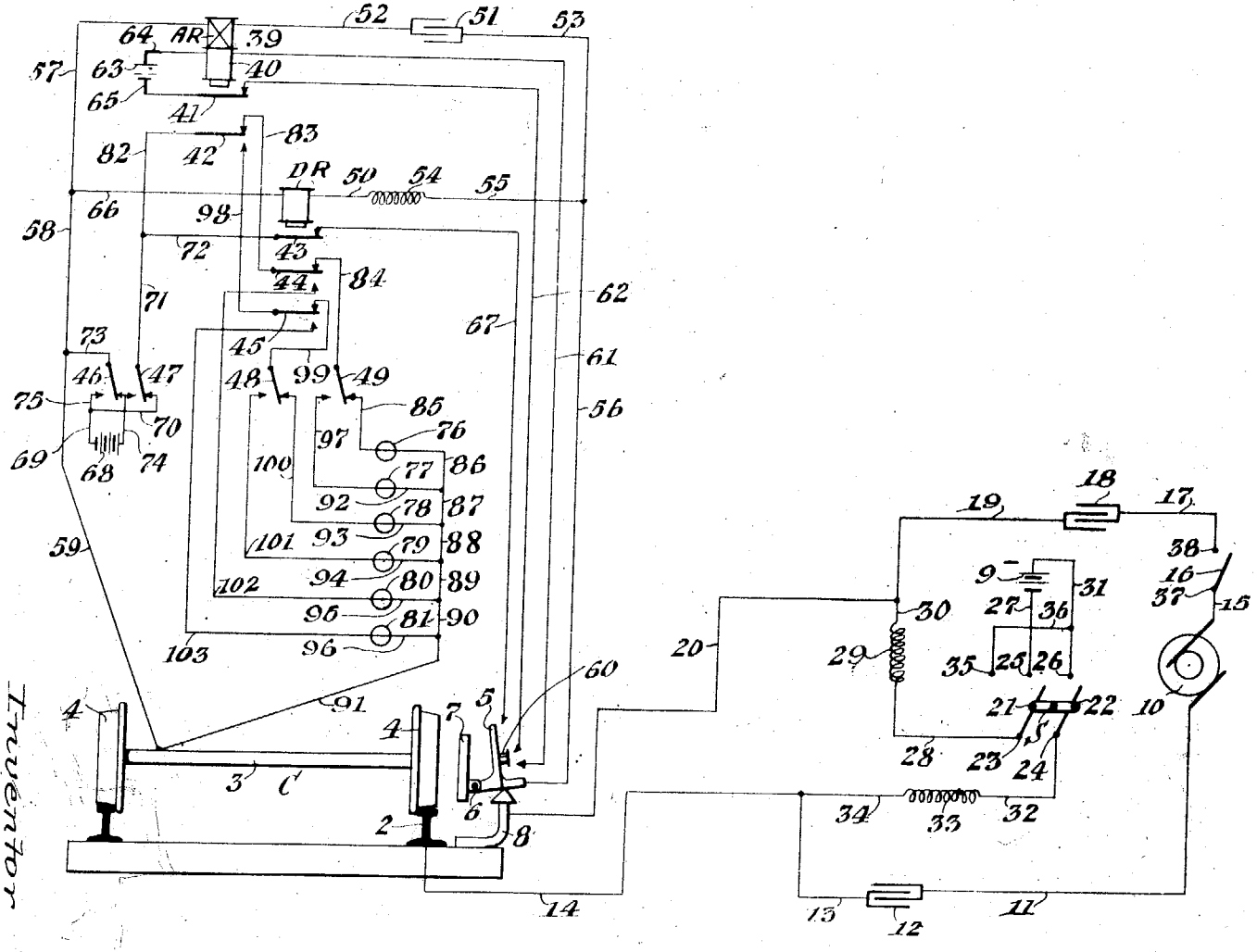
Inventor
PAUL J. SIMMEN
by John S. Powers
Attorneys Reissued Feb. 13, 1923. Re. 15,541

UNITED STATES PATENT OFFICE.

PAUL J. SIMMEN, OF BUFFALO, NEW YORK.

AUTOMATIC TRAIN CONTROL.

Original No. 1,399,027, dated December 6, 1921, Serial No. 369,131, filed March 26, 1920. Application for reissue filed July 15, 1922. Serial No. 575,411.

*To all whom it may concern:*

Be it known that I, PAUL J. SIMMEN, a citizen of the United States, and resident of the city of Buffalo, in the county of Erie and State of New York, have invented a new and useful Automatic Train Control, of which the following is a specification.

This invention relates to railways and particularly to the control of cars or trains thereon.

An important object of this invention is an arrangement and construction of train control whereby trackway means are enabled to create a plurality of distinctive conditions upon the car or train, which distinctive conditions may be used to appropriately govern the train in as many different ways.

Other objects and advantages of the invention will appear as the description, hereinafter appearing of the particular physical embodiment which has been selected to illustrate the principle of the invention, progresses, and the novel features of the invention will be particularly included in the claims hereto appended.

The invention consists in the combinations and constructions, embodying the principle of the invention, and particularly described in the specification and pointed out in the claims for one particular physical embodiment of the invention.

In describing the principle of the invention, reference is had to an illustrative physical embodiment illustrated by a single schematic view in the drawings forming a part of this specification, which drawing illustrates the invention as applied to a car.

In the drawing used for illustrating the particular physical embodiment of the principle of my invention, an ordinary railroad tie is shown at 1. Mounted on this tie in the usual and ordinary manner are the rails 2.

A car is illustrated as being on the rails 2 by the showing of the ordinary axle 3 and the wheels 4.

The car, which is designated as a whole by C, carries a relay A R and another relay D R. These relays are used to suitably control the schematically illustrated devices 76 and 81, inclusive. These devices 76 and 81 inclusive, may be of any sort desired which may be operated to one condition by a flow of electrical energy and which will assume another condition when the flow of electrical energy ceases. They may be any of the well known devices, which register or record a condition or which control a train directly or through the intervention of a human agency. The devices 76 to 81 inclusive are merely the means by which the plurality of different conditions on the train may be made manifest. The devices 76 to 81 inclusive as will be hereinafter fully pointed out are controlled by appropriate energizations of relays A R and D R.

In order to appropriately control the relays A R, and D R on the car C, a shoe 5 is provided on the car C pivoted at the point 6 to the bracket 7 secured in any appropriate and suitable manner to a portion of the car. This shoe 5 operates electrical contacts and contacts with and is lifted by the ramp 8 positioned alongside of a rail, as 2, in any suitable or appropriate manner on the trackway and supported, as by means of tie 1.

In order to enable the shoe 5 by contact with the ramp 8 to effectuate its purpose, that is, control relays A R and D R there is provided on the trackway a source of direct current 9 and a source of alternating current 10. The alternating current generator 10 is connected to one rail 2 by means of wire 11, condenser 12 and wires 13 and 14. The other terminal of alternating generator current 10 is connected to ramp 8 by means of wire 15, hand switch 16, wire 17, condenser 18 and wires 19 and 20.

The source of direct current 9, herein illustrated as a battery, is also connected to the rail 2 and the ramp 8. As it is desired to at times have ramp 8 connected with the positive terminal of source 9 and the rail 2 connected with the negative terminal while at other times it is desired to have the ramp 8 connected to the negative terminal of source 9 and the rail 2 connected to the positive terminal of source 9 the reversing switch designated as a whole by S is interposed between the rail 2 and the ramp 8 and the source 9. The two conducting arms 21 and 22 of the switch S are pivoted at the points 23 and 24 respectively. When the arms 21 and 22 are moved into contact with the points 25 and 26 respectively, then the ramp 8 is positively energized, that is, is connected to the positive terminal of the source 9, the connection being as follows: wire 27, point 25, arm 21, pivot 23, wire 28, choke coil 29 and wires 30 and 20. At the same time the rail 2 is connected to the negative terminal of source 9 as follows: wire 31, point 26, conducting arm 22, pivot 24, wire 32, choke coil 33 and wires 34 and 14 to the rail 2. In case it is desired to negatively energize ramp 8, that is, have the ramp 8 connected with the negative terminal of source 9 then the conducting arms 21 and 22 of switch S are moved into contact with points 35 and 25, respectively, so that then the connection from the negative terminal of the source 9 to the ramp 8 is as follows: wires 31 and 36, point 35, conducting arm 21, pivot 23, wire 28, choke coil 29 and wires 30 and 20 to the ramp 8. At the same time the rail 2 is connected to the positive terminal of source 9 as follows: wire 27, point 25, conducting arm 32, pivot 24, wire 32, choke coil 33 and wires 34 and 14 to the rail 2. It will of course be evident that when it is desired to have ramp 8 neither electrified positively or negatively the conducting arms 21 and 22 of switch S will be moved out of contact with all of the points 25, 26 and 35 and it will also be evident that switch arm 16 may be pivoted on point 37 so as to be moved into contact or out of contact with point 38. The condensers 12 and 18 are inserted in the circuit of alternating current generator 10 in order to prevent the direct current from the source 9 from flowing through the alternating current generator. The choke coils 29 and 33 are inserted in the circuit of the direct current source 9 in order to prevent alternating current from the alternating generator current 10 from flowing through or to the direct current source 9.

The relay A R on the car C is double wound, that is, it has a winding 39 and a winding 40. This relay also has two armatures 41 and 42, which are in the upper position as shown when either of the coils 39 or 40 is energized but move to a lower position when both of the coils 39 and 40 are deenergized.

The relay D R has armatures 43, 44 and 45, which when the relay is energized are in the upper position as shown, but when the relay is deenergized are in a lower position. The relay D R also includes what are known as polarized armatures 46, 47, 48 and 49. These armatures swing from right to left as viewed in the drawing. When the relay D R is energized positively, that is, when the current enters D R by means of wire 50, then all of the armatures 46 to 49 inclusive swing to the right to the position as shown in the drawing. When, however, the current leaves the relay D R by means of wire 50, that is, when it is negatively energized, then all of the armatures 46 to 49 inclusive swing to a left hand position corresponding to the right hand position as shown in the drawing.

It is the intention to have the coil 39 of relay A R operated by alternating current only and consequently the condenser 51 is inserted between wires 52 and 53 so that only alternating current may reach the coil 39 of relay A R. On the other hand it is the intention to have relay D R operate only by direct current, consequently a choke coil 54 is inserted between the wires 50 and 55 so that only direct current may reach the relay D R.

If alternating current from the generator 10 is supplied to ramp 8 then as the car C advances and causes the shoe 5 to contact with ramp 8 the alternating current will flow from ramp 8 by means of wires 56 and 53 to and through condenser 51, then through wire 52, through the coils 39 of relay A R and thence by means of wires 57, 58 and 59 to the axle 3, and thence by wheels 4 and rail 2 to the wire 14, thus returning to the alternating current generator. The result of current flowing in the above traced path will be the energization of relay A R causing armatures 41 and 42 to be raised if they are in the lower position or to hold them in the raised position if they are already raised. Ramp 8, is, as usual, inclined on both ends, and allows the shoe 5 to gradually lower as the car C passes the ramp, so that insulated metallic plate 60 connects wires 61 and 62 before the shoe 5 actually leaves the ramp 8. The connection of wires 61 and 62 by the shoe 5 while the armature 41 is in a raised position causes a stick circuit to be formed through the coil 40 of the relay A R which circuit serves to maintain the relay A R energized until the advancing car C causes its shoe 5 to contact with another ramp 8. This stick circuit is as follows: one terminal of battery 63, wire 64, coil 40 of relay A R, wire 61, plate 60, wire 62, armature 41 in the raised position and wire 65 to the other terminal of battery 63.

If the ramp 8 is positively energized then when the shoe 5 contacts therewith direct current will flow through the relay D R entering by means of wire 50. The circuit is as follows: ramp 8, shoe 5, wires 56 and 55, choke coil 54, wire 50, relay D R and wires 66, 58 and 59, axle 3, rail 2 and wire 14 to the other side of the source 9, the conducting arms 21 and 22 being in contact with the points 25 and 26 respectively. The ramp 8, being inclined on both ends, the shoe 5 will be lowered and make contact with the wire 67 before the shoe 5 breaks contact with the ramp 8 so that the armature 43 being in the raised position a stick circuit for relay D R will be formed as follows: one terminal of the battery 68, wires 69 and 70, polarized armature 47 which was thrown to the position shown by the positive energization of relay D R, wires 71 and 72, armature 43, wire 67, shoe 5, wires 56 and 55, choke coil 54, wire 50, relay D R, wires 66, 58, and 73, polarized armature 46 and wire 74 to the other terminal of the battery 68. The current flowing in the above traced path will maintain the relay D R energized while the car C is passing between ramps. The positive energization of relay D R causes polarized armatures 46 to 49 inclusive, to be moved to the right as shown in the drawing.

If the ramp 8 is negatively energized then the positive current, when the shoe 5 contacts with ramp 8, will flow from wire 14 to rail 2, the circuit then being as follows: wheel 4, axle 3, wires 59, 58 and 66, relay D R, wire 50, choke coil 54, wires 55 and 56, shoe 5, ramp 8 and thence by wire 20 to the negative terminal of the source 9, it being understood that the conducting arms 21 and 22 of the switch S are in contact with the points 35 and 25 respectively. The current flowing in the above traced path will negatively energize relay D R and so cause the polarized armatures 46 to 49 inclusive to swing to a left hand position corresponding to the right hand position as shown in the drawing. Even when relay D R is negatively energized it will also be stuck up by a circuit as follows: battery 68, wires 69 and 75, polarized armature 46 in the left hand position by reason of the previous negative energization of relay D R, wires 73, 58 and 66, relay D R, wire 50, choke coil 54, wires 55 and 56, shoe 5, wire 67, armature 43, wires 72 and 71, polarized armature 47 in the left hand position, and wire 74 to the other terminal of the battery 68.

It will of course be understood that whether relay D R is energized positively or negatively the armatures 43, 44 and 45 will be in the upper position and it will be only when relay D R is not energized at all that the armatures 43 to 45 inclusive are in the lower position. It will also be understood that polarized armatures 46 to 49 inclusive will remain in the position to which they have last been moved until the relay D R has been reversely energized.

Device 76 is energized when alternating current potential is applied to ramp 8 is in addition positively energized. Under these conditions relay A R is energized, relay D R is energized and the armatures 46 to 49 inclusive, are moved to the right as shown in the drawing. Under these conditions a circuit is formed through device 76 as follows: battery 68, wires 69 and 70, armature 47, wires 71 and 82, armature 42, wire 83, armature 44, wire 84, armature 49, wire 85, device 76, wires 86, 87, 88, 89, 90, 91, 59 and 73, armature 46 and wire 74 to the other terminal of battery 68.

Device 77 is energized when alternating current potential is impressed upon ramp 8 and also the ramp is negatively energized, that is, direct current potential is impressed upon rail 2. Under these conditions relay A R is energized, relay D R is energized and armatures 46 to 49 inclusive are moved to the left hand position. Under these conditions a circuit is formed through device 77 as follows: battery 68, wires 69 and 75, armature 46 in the left hand position, wires 73, 59, 91, 90, 89, 88, 87, 92, device 77, wire 97, armature 49 in the left hand position, wire 84, armature 44, wire 83, armature 42, wires 82 and 71, armature 47 in the left hand position and wire 74 to the other terminal of battery 68.

Device 78 is energized when the ramp 8 is positively energized, only, that is, when only a direct current potential is impressed upon ramp 8. Under these conditions relay A R would be deenergized due to the breaking of the stick circuit by the raising of shoe 5 when it contacts with the ramp 8 and relay D R would be energized and the armatures 46 to 49 inclusive placed in the right hand position as shown in the drawing. Under these conditions the device 78 would be energized by a circuit as follows: battery 68, wires 69 and 70, polarized armature 47, wires 71 and 82, armature 42 in the lower position, wire 98, armature 45, wire 99, armature 48 in the right hand position, wire 100, device 78, wires 93, 88, 89, 90, 91, 59, 73, armature 46, in the right hand position, and wire 74 to the other terminal of the battery 68.

Device 79 would be energized when the ramp 8 is negatively energized only, that is, when the rail 2 has a direct current potential impressed upon it and no alternating current is supplied to ramp 8. Under these conditions the relay A R would be deenergized and the relay D R would be energized and the polarized armatures 46 to 49 inclusive, would be in the extreme left hand position corresponding to the right hand position as shown upon the drawing. Under these conditions a circuit would be formed through device 79 as follows: battery 68, wires 69 and 75, armature 46 in the left hand position, wires 73, 59, 91, 90, 89 and 94, device 79, wire 101, polarized armature 48 in the left hand position, wire 99, armature 45, wire 98, armature 42 in the lower position, wires 82 and 71, polarized armature 47 in the left hand position and wire 74 to the other terminal of the battery 68.

The device 80 would be energized when an alternating current potential only is impressed upon the ramp 8. Under these conditions relay A R would be energized but relay D R would be deenergized because its stick circuit would be broken at plate 60 by the raising of the shoe 5 by the ramp 8. Under such conditions device 80 would be energized through a circuit as follows: battery 68, wires 69 and 75, armature 46 assuming that the last energization of relay D R was negative, wires 73, 59, 91, 90 and 95, device 80, wire 102, armature 44 in the lower position, wire 83, armature 42, wires 82 and 71, armature 47 in the left hand position and wire 74 to the other terminal of battery 68.

Device 81 is energized when either a direct current potential or an alternating current potential is impressed upon the ramp 8 or the rail 2. Under such conditions both relays A R and D R will be deenergized and their armatures in the lower position. Under such conditions a circuit through device 81 will be formed as follows: battery 68, wires 69 and 75, polarized armature 46 in the left hand position, assuming that relay D R was last negatively energized, wires 73, 59, 91 and 96, device 81, wire 103, armature 45 in the lower position, wire 98, armature 42 in the lower position, wires 72 and 81, polarized armature 47 in the left hand position and wire 74 to the other terminal of battery 68.

From the above description it will be apparent that the following conditions prevail, that is, that the devices 76 to 81 inclusive are energized when the conditions are as follows: device 76 is energized when ramp 8 is energized with alternating current and positively energized with direct current; device 77 is energized when ramp 8 is energized with alternating current and negatively energized with direct current; device 78 is energized when ramp 8 is positively energized with direct current only; device 79 is energized when ramp 8 is negatively energized with direct current only; device 80 is energized when ramp 8 is energized with alternating only; and device 81 is energized when either alternating current or direct current is supplied to ramp 8.

In the foregoing description, devices 76 to 81 inclusive have not been specifically designated as representing any particular specific device. This is because the schematic showing of these devices 76 to 81 inclusive, is intended to include any and all devices appropriate for either directly controlling a car or train as by means of the air brake or indirectly as by means of a lamp or other signal given to the driver of the train so that he may then control the train or may represent registering or recording devices for indicating the condition set up on the train or car.

Although the sources of current have been shown as manually controlled it is to be understood that any of the well known methods of controlling these sources for connection or disconnection with ramp 8 are contemplated.

It should also be further understood that ramp 8 is only a schematic illustration of the ordinary and conventional ramp having a horizontal portion and an incline at both ends and that the number used and their position and spacing longitudinally of the track is dependent upon the result sought to be accomplished in the control of the train.

Although the construction of one physical embodiment of the invention has been particularly described and the operation and principle thereof explained nevertheless it is desired to have it understood that the form selected is merely illustrative but does not exhaust the possible physical embodiments of the idea of means underlying the invention.

What is claimed as new and desired to secure by Letters Patent of the United States, is:

1. In an automatic train control, in combination: a roadway; a car; a source of electric current of one characteristic on the roadway; a source of electric current of another characteristic on the roadway and having at least two variations of that characteristic; electrical receiving devices on the car; means for conditioning the electrical receiving devices on the car from the said sources whereby at least four distinctive conditions of the electrical receiving devices may be obtained.

2. In an automatic train control, in combination: a roadway; a car; six electrical receiving devices on the car; a source of electric current of one characteristic on the roadway; a source of electric current of another characteristic on the roadway and having at least two variations of that characteristic; means including a single ramp for connecting the said sources with and disconnecting the said sources from the six electrical receiving devices so that six distinctive conditions are established.

3. In an automatic train control, in combination: a roadway; a source of electric current of one characteristic on the roadway; a source of electrical current of another characteristic on the roadway and having at least two variations of that characteristic; two electrical devices on the car; means for energizing one of the electrical devices by current of one characteristic and means for energizing the other of the electrical devices by current of the other characteristic and means controlled jointly by the two electrical devices for train control.

4. In an automatic train control, in combination on a roadway; a source of electric current of one characteristic on the roadway; a source of electric current of another characteristic on the roadway and having at least two variations of that characteristic; an electrical device on the car; a second electrical device on the car including an armature differently operated by the said variations; means for energizing the first mentioned electrical device by current of one characteristic; means for energizing the second mentioned electrical device by the variations of the current of the other characteristic and means controlled jointly by the first mentioned electrical device and the armature of the second mentioned electrical device for train control.

5. In an automatic train control, in combination: a source of alternating current; a source of direct current; two wires; means connecting the first mentioned means, including condensers, with the wires; means connecting the second mentioned source with the wires including reactances; train control devices and means connecting the two wires with the train control devices.

6. In an automatic train control, in combination: a roadway; a car; a source of electric current of one characteristic on the roadway; a source of electric current of another characteristic on the roadway; electrical receiving devices on the car; and means in cooperation selectively with the sources of current singly or in their combination whereby at least four distinctive conditions of the electrical receiving devices may be obtained.

7. In an automatic train control, in combination; a roadway; a car; a source of alternating current on the roadway; a source of direct current on the roadway; two wires; means severally connecting said sources with said wires and adapted for operation selectively, singly or simultaneously; electrical receiving devices on the car; and means connecting the wires with the electrical receiving devices whereby said devices are severally responsive to particular electrical conditions of said wires.

8. In an automatic train control, in combination: a roadway; a car; a source of alternating current on the roadway; a source of direct current on the roadway; a ramp through which current from said sources is passed; means for selecting current from said sources singly or in combination; a circuit on the car taking alternating current from said ramp; another circuit on the car taking direct current from the ramp; electrical receiving devices on the car; means in said circuits for conditioning said electrical receiving devices; and means for continuing the operation of said last named means as produced by the electrical condition of the ramp after the car has passed beyond the ramp.

9. In an automatic train control, in combination; a roadway; a car; a source of current of one characteristic on the roadway; a source of current of another characteristic on the roadway; a ramp through which current from said sources is passed; means for selecting current from said sources singly or in combination; a circuit on the car taking current of the first characteristic from said ramp; another circuit on the car taking current of the second characteristic from said ramp; electrical receiving devices on the car; means in said circuits for conditioning said electrical receiving devices; and means for continuing the operation of said last named means as produced by the electrical condition of the ramp after the car has passed beyond the ramp.

10. In an automatic train control, in combination: a roadway; a car; an alternating current relay on the car; a direct current relay on the car; electrical receiving devices conditioned by the armatures of said relays; means arranged at intervals along the roadway for supplying operating currents of different characteristics to said relays; said relays being subject to operation singly or simultaneously according to the electrical condition of said means; and means on the car effective when the car has passed beyond said first named means for continuing the operation of said armatures as produced by the electrical condition of said first named means.

11. In an automatic train control, in combination: a roadway; a car; a relay on the car operated by electrical current of one characteristic; a second relay on the car operated by electrical current of another characteristic; electrical receiving devices conditioned by the armatures of said relays; means arranged at intervals along the roadway for supplying operating currents of different characteristics to said relays; said relays being subject to operation singly or simultaneously according to electrical condition of said means; and means on the car effective when the car has passed beyond said first named means for continuing the operation of said armatures as produced by the electrical condition of said first named means.

12. In an automatic train control, in combination: a roadway; a car; a relay on the car operated by electrical current of one characteristic; a second relay on the car operated by electrical current of another characteristic; electrical receiving devices conditioned by the armatures of said relays; means arranged at intervals along the roadway for supplying operating currents of different characteristics to said relays; said relays being subject to operation singly or simultaneously according to the electrical condition of said means; means on the car for supplying operating current to said receiving devices; and means including elements in cooperation with said last named means, and effective when the car has passed beyond said first named means for continuing the operation of said armatures as produced by the electrical condition of said first named means.

13. In an automatic train control, in combination: a roadway; a car; electrical receiving devices and a current source on the car; circuits for the electrical receiving devices, said circuits including said current source and one of said circuits being normally closed; means for selectively conditioning said circuits; sources of current of different characteristic on the roadway; co-operating elements on the roadway and the car for intermittently supplying current from either or both of said roadway current sources to said conditioning means; and means effective in the intermissions between the co-operative actions of said elements for continuing the condition of said circuits as next previously established by said elements.

14. In an automatc train control, in combination: a roadway: a car; intermittently interrupted, normally electrified ramps along the roadway: sources of current of different characteristic along the roadway so connected to said ramps that current may be supplied selectively from said sources singly or in combination; a shoe on the car adapted to be displaced by said ramps; a switch on the car open by such displacement; magnets on the car having their armatures provided with front stops and severally responsive to the particular currents transmitted by said ramps; a current source on the car; electrical receiving devices on the car; circuits for the electrical receiving devices, said circuits including said current source on the car and one of said circuits being normally closed; normally closed self-restoring circuits including said magnets, said shoe, said switch, said armatures and said front stops whereby either of said magnets is automatically self-restoring to normal condition, attracting its armature whenever said shoe passes beyond an electrified ramp.

15. In an automatic train control, in combination: a roadway; a car; intermittently interrupted, normally electrified ramps along the roadway; sources of current of different characteristic along the roadway so connected to said ramps that current may be supplied selectively from said sources singly or in combination; a shoe on the car adapted to be displaced by said ramps; a switch on the car open by such displacement; magnets on the car having their armatures provided with front stops and severally responsive to the particular currents transmitted by said ramps; a current source on the car; electrical receiving devices on the car; circuits for the electrical receiving devices, said circuits including said current source on the car and one of said circuits being normally closed; normally closed self-restoring circuits severally including said magnets, one of said circuits including said switch and the armature and front stop of its corresponding magnet, the other circuit including said shoe and the armature and front stop of its corresponding magnet and having a permanent branch connection to ground, whereby either of said magnets is automatically self-restoring to normal condition, attracting its armature whenever said shoe passes beyond an electrified ramp.

16. In an automatic train control, the combination of a car, a roadway, electrical receiving devices on the car, sources of current of different characteristic on the roadway, intermittently arranged ramps to which current from either or both of said sources is transmitted, means on the car for conditioning said devices from and in accordance with the current delivered at said ramps, and means for automatically continuing the operation of a receiving device after the car has passed beyond the electrified ramp by which the operation of such receiving device was initiated.

17. In an automatic train control, a car, a roadway, and electrical receiving devices on the car, in combination with sources of current of different characteristic on the roadway, intermittently arranged ramps to which current from either or both of said sources is transmitted, means on the car for conditioning said devices from and in accordance with the current delivered at said ramps, and means for automatically continuing the operation of a receiving device after the car has passed beyond the electrified third rail by which the operation of such receiving device was initiated and in further combination with another electrical receiving device and means for causing the operation of said last named receiving device in the absence of energy at said ramps and for continuing such operation until the car passes in relation to an electrified ramp.

PAUL J. SIMMEN.